United States Patent
Kamada

(10) Patent No.: US 10,467,483 B2
(45) Date of Patent: Nov. 5, 2019

(54) IMAGE ACQUIRING SYSTEM, TERMINAL, IMAGE ACQUIRING METHOD, AND IMAGE ACQUIRING PROGRAM

(71) Applicant: PIONEER CORPORATION, Tokyo (JP)

(72) Inventor: Takahiro Kamada, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 47 days.

(21) Appl. No.: 15/121,966

(22) PCT Filed: Feb. 28, 2014

(86) PCT No.: PCT/JP2014/055162
§ 371 (c)(1),
(2) Date: Aug. 26, 2016

(87) PCT Pub. No.: WO2015/129045
PCT Pub. Date: Sep. 3, 2015

(65) Prior Publication Data
US 2017/0011270 A1     Jan. 12, 2017

(51) Int. Cl.
*G06K 9/00*     (2006.01)
*H04N 7/18*     (2006.01)
(Continued)

(52) U.S. Cl.
CPC ............ *G06K 9/00798* (2013.01); *B60R 1/00* (2013.01); *G01C 21/20* (2013.01); *G06K 9/00825* (2013.01); *G08G 1/0112* (2013.01); *G08G 1/0129* (2013.01); *G08G 1/04* (2013.01); *G08G 1/096716* (2013.01); *H04N 7/183* (2013.01); *B60R 2300/80* (2013.01)

(58) Field of Classification Search
None
See application file for complete search history.

(56) References Cited

U.S. PATENT DOCUMENTS 7,650,110 B2 *   1/2010   Kawamura ........ H04N 1/00307
                                                          455/3.05
2015/0052567 A1 *   2/2015   Kim ..................... H04N 21/643
                                                          725/86

FOREIGN PATENT DOCUMENTS

JP          2004-205344        7/2004
JP          2004205344     *   7/2004
(Continued)

OTHER PUBLICATIONS

International Search Report, PCT/JP2014/055162, dated May 13, 2014.

*Primary Examiner* — Christopher Braniff
(74) *Attorney, Agent, or Firm* — Young & Thompson

(57) ABSTRACT

An image acquiring system (100) includes an image acquiring apparatus (101) and a terminal (111). The image acquiring apparatus (101) acquires an image recorded by the terminal (111) and position information indicating a position at which the image is recorded, determines the state of a road included in the image based on the image, and associates and stores the state of the road and the position information. If the terminal (111) transmits to the image acquiring apparatus (101), a request for information concerning the state of a given road, the image acquiring apparatus (101) transmits the determined state of the road and the position information to the terminal (111).

9 Claims, 10 Drawing Sheets

(51) Int. Cl.
  *G08G 1/01*  (2006.01)
  *B60R 1/00*  (2006.01)
  *G01C 21/20*  (2006.01)
  *G01C 21/32*  (2006.01)
  *G01W 1/00*  (2006.01)
  *G08G 1/0967*  (2006.01)
  *G08G 1/04*  (2006.01)

(56) References Cited

FOREIGN PATENT DOCUMENTS

| | | | |
|---|---|---|---|
| JP | 2005-172578 | | 6/2005 |
| JP | 2005172578 | * | 7/2006 |
| JP | 2011-145756 | | 7/2011 |
| JP | 2012-108586 | | 6/2012 |
| JP | 2013-092921 | | 5/2013 |

* cited by examiner

FIG.4

| | RECORDING INFORMATION 401 | | | | ROAD INFORMATION 402 | | | | | | | |
|---|---|---|---|---|---|---|---|---|---|---|---|---|
| 411 RECORDING COORDINATES (LATITUDE, LONGITUDE) | 412 TRAVELING DIRECTION (DEGREES) | 413 ROAD NUMBER (NUMERIC VALUE) | 414 ROAD POSITION (0 - 1) | 415 ROAD DIRECTION (INBOUND/ OUTBOUND) | 421 WIDTH (m) | 422 OPERATION STATE OF TRAFFIC LIGHT (NOT CHECKED -, OPERATING: TRUE, SUSPENDED: FALSE) | 423 CRACK (PRESENT: TRUE, ABSENT: FALSE) | 424 SNOW COVER (PRESENT: TRUE, ABSENT: FALSE) | 425 ICE (PRESENT: TRUE, ABSENT: FALSE) | 426 MUD (PRESENT: TRUE, ABSENT: FALSE) | 427 FLOOD (PRESENT: TRUE, ABSENT: FALSE) | 428 RUT (PRESENT: TRUE, ABSENT: FALSE) |
| 135.001, 35.544 | 352 | 7993346 | 0.75 | INBOUND | 5 | - | FALSE | FALSE | FALSE | FALSE | FALSE | FALSE |
| 135.001, 35.54402 | 357 | 7993346 | 0.82 | INBOUND | 4.5 | - | FALSE | FALSE | FALSE | FALSE | FALSE | FALSE |
| 135.001, 35.54403 | 356 | 7993346 | 0.95 | INBOUND | 5 | TRUE | FALSE | FALSE | FALSE | FALSE | FALSE | FALSE |

| 411a | 412 | 413a | 414 | 415 | 421 | 422 | 423 | 424 | 425 | 426 | 427 | 428 |
|---|---|---|---|---|---|---|---|---|---|---|---|---|
| RECORDING INFORMATION 401 | | | | | ROAD INFORMATION 402 | | | | | | | |
| EVENT COORDINATES (LATITUDE, LONGITUDE) | TRAVELING DIRECTION (DEGREES) | EVENT-OCCURRING ROAD NUMBER (NUMERIC VALUE) | ROAD POSITION (0 - 1) | ROAD DIRECTION (INBOUND/ OUTBOUND) | WIDTH (m) | OPERATION STATE OF TRAFFIC LIGHT (NOT CHECKED -: OPERATING: TRUE, SUSPENDED: FALSE) | CRACK (PRESENT: TRUE, ABSENT: FALSE) | SNOW COVER (PRESENT: TRUE, ABSENT: FALSE) | ICE (PRESENT: TRUE, ABSENT: FALSE) | MUD (PRESENT: TRUE, ABSENT: FALSE) | FLOOD (PRESENT: TRUE, ABSENT: FALSE) | RUT (PRESENT: TRUE, ABSENT: FALSE) |
| 135.001, 35.551 | 352 | 7993347 | 0.75 | INBOUND | 5 | - | FALSE | FALSE | FALSE | FALSE | FALSE | FALSE |
| 135.001, 35.54411 | 357 | 7993347 | 0.82 | INBOUND | 4.5 | - | FALSE | FALSE | FALSE | FALSE | FALSE | FALSE |
| 135.001, 35.54412 | 356 | 7993347 | 0.95 | INBOUND | 5 | TRUE | FALSE | FALSE | FALSE | FALSE | FALSE | FALSE |

400

US 10,467,483 B2

IMAGE ACQUIRING SYSTEM, TERMINAL, IMAGE ACQUIRING METHOD, AND IMAGE ACQUIRING PROGRAM

TECHNICAL FIELD

The present invention relates to an image acquiring system, a terminal, an image acquiring method, and an image acquiring program that acquire a recorded image including a road. However, application of the present invention is not limited to the image acquiring system, the terminal, the image acquiring method, and the image acquiring program.

BACKGROUND ART

A technology has been suggested in which identification information (such as vehicle type) and traveling history data (such as position and time) of a vehicle traveling on a road are transmitted to a server, and based on the identification information and the traveling history data, the server creates a database that stores for each road, the size of vehicle (such as vehicle type) that can travel on the road (for example, refer to Patent Document 1).

Patent Document 1: Japanese Laid-Open Patent Publication No. 2013-92921

DISCLOSURE OF INVENTION

Problem to be Solved by the Invention

In the conventional technology, however, actual road conditions such as cracks and ice on a road, the operation of a traffic light, etc. cannot be determined, and thus the road conditions cannot be reflected in the database. Consequently, there is a problem that the server cannot deliver road conditions after a disaster occurs.

Means for Solving Problem

To solve the problem described above and achieve an object, the image acquiring system according to an embodiment of the invention includes: an acquiring unit that acquires an image and position information indicating a position at which the image is recorded; a determining unit that determines a state of a road included in the image based on the image; a storing unit that associates and stores the state of the road and the position information; and a transmitting unit that transmits the state of the road and the position information.

The terminal according to an embodiment of the invention includes: a camera that records an image; a transmitting unit that transmits the image, position information indicating a position at which the image is recorded, and a request for information concerning a state of a given road; a receiving unit that receives the information concerning the state of the given road; and a display unit that displays the received information concerning the state of the given road.

The image acquiring method according to an embodiment of the invention includes: acquiring an image and position information indicating a position at which the image is recorded; determining a state of a road included in the image based on the image; associating and storing the state of the road and the position information; and transmitting the state of the road and the position information.

The image acquiring method according to an embodiment of the invention includes: recording an image; transmitting the image, position information indicating a position at which the image is recorded, and a request for information concerning a state of a given road; receiving the information concerning the state of the given road; and displaying the received information concerning the state of the given road.

The image acquiring program according to an embodiment of the invention causes a computer to execute the image acquiring method as set forth above and further disclosed below.

BRIEF DESCRIPTION OF DRAWINGS

FIG. 4 is a diagram of an example of a database stored through image analysis according to a first embodiment;

FIG. 9 is a diagram of an example of a database changed through image processing according to a fourth embodiment;

BEST MODE(S) FOR CARRYING OUT THE INVENTION

Embodiments

Preferred embodiments of an image acquiring system, a terminal, an image acquiring method, and an image acquiring program according to the present invention will be described in detail with reference to the accompanying drawings.

Figure 1:
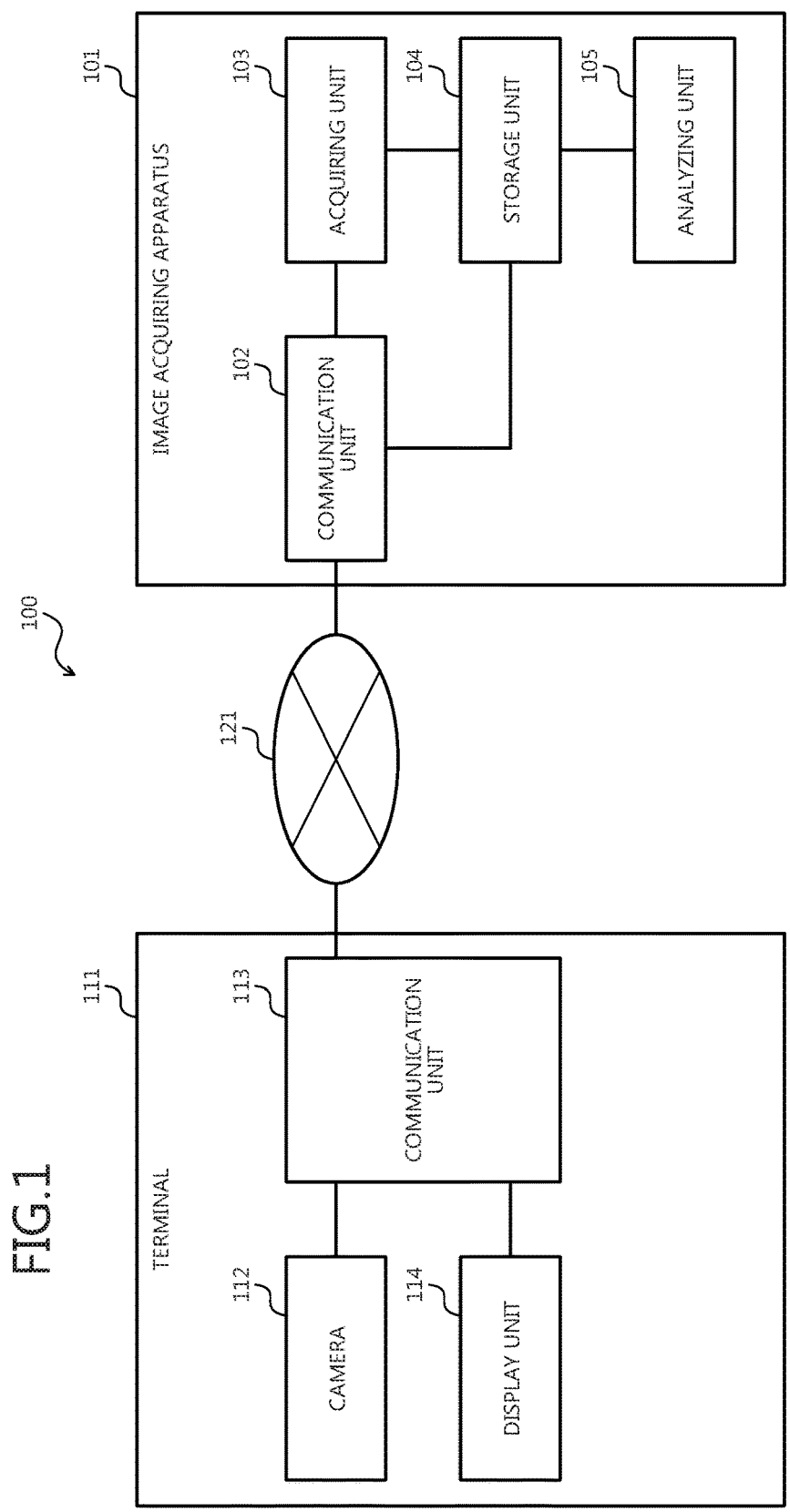
FIG. 1 is a block diagram of an example of a functional configuration of an image acquiring system according to an embodiment.

FIG. 1 is a block diagram of an example of a functional configuration of an image acquiring system according to an embodiment. An image acquiring system 100 according to the embodiment includes an image acquiring apparatus 101 and a terminal 111.

The image acquiring apparatus 101 includes a communication unit 102, an acquiring unit 103, a storage unit 104, and an analyzing unit 105. According to the embodiment, a single server has functions of these units. However, as described later, the functions depicted in FIG. 1 may be distributed to multiple servers, or a single client (terminal 111) may have the functions of the image acquiring apparatus 101, without using any server.

The communication unit 102 is connected to the terminal 111 via a network 121 such as the Internet, and exchanges data with the terminal 111. The acquiring unit 103 receives from the terminal 111, an image including a road and recording information including the recording position at which the image is recorded, and associates and stores the image and the recording information into the storage unit 104.

The analyzing unit 105 analyzes the image stored in the storage unit 104, and determines road conditions. The road conditions determined through the image analysis include, for example, the width of road at each position, the operation state of traffic light, and the presence/absence of crack, snow cover, and ice.

The analyzing unit 105 stores into the storage unit 104, a database in which the result of the analysis (road information) is associated with the recording information (recording position). This database may include the recorded image. The road information stored in the storage unit 104 is delivered to the terminal 111 in response to a request from the terminal 111. For example, road information of a road corresponding to a position and/or a path specified by the terminal 111 is delivered to the terminal 111 via the communication unit 102.

The terminal 111 includes a camera 112, a communication unit 113, and a display unit 114. This terminal 111 is mounted on a moving object (for example, a vehicle). As the vehicle travels, the terminal 111 records an image including a road by the camera 112, and associates and transmits to the image acquiring apparatus 101 via the communication unit 113, the image and the recording position (for example, longitude and latitude measured by GPS) at which the image is recorded.

If the camera 112 is configured to record the forward direction of the vehicle, the recorded image may include a forward position on a road, that is, a position away from the vehicle by a given distance in the traveling direction. Corresponding to the position deviation between the recording position and the recorded image, through the image analysis, the analyzing unit 105 may correct and store the recording position transmitted from the terminal 111 to a position away from the vehicle by the given distance in the traveling direction, thereby enhancing the accuracy of the recording position of the recorded image.

The terminal 111 requests road information of a given road to the image acquiring apparatus 101, and receives the road information transmitted from the image acquiring apparatus 101 via the communication unit 113. The received road information at the given position is displayed on the display unit 114. The image acquiring apparatus 101 may also transmit to the terminal 111, the recorded image for the given position from the database stored in the storage unit 104, thereby enabling the image to be checked at the terminal 111.

The image acquiring apparatus 101 may deliver the result of the analysis (road information) for each road to the terminal 111. The image acquiring apparatus 101 may deliver the road information that is the result of the analysis not only to the terminal 111 that requests to acquire the road information, but also to terminals 111 even when no request is received from the terminals 111. If the result of the analysis indicates a significant change from the previous road conditions (for example, if the operation of traffic light is suspended), the road information may be automatically delivered to the terminals 111 that do not request the road information.

The acquiring unit 103 collects traveling history for each size of vehicles on which terminals 111 are mounted, thereby enhancing the accuracy of road information such as the width of road at each position, the operation state of traffic light, etc.

The image acquiring apparatus 101 acquires map data by the acquiring unit 103. If a road corresponding to the traveling history (recording positions of images) acquired from the terminal 111 is not included in the map data, the image acquiring apparatus 101 may newly store the road into the storage unit 104 as a new passable road, and deliver the road to the terminal 111.

Figure 2:
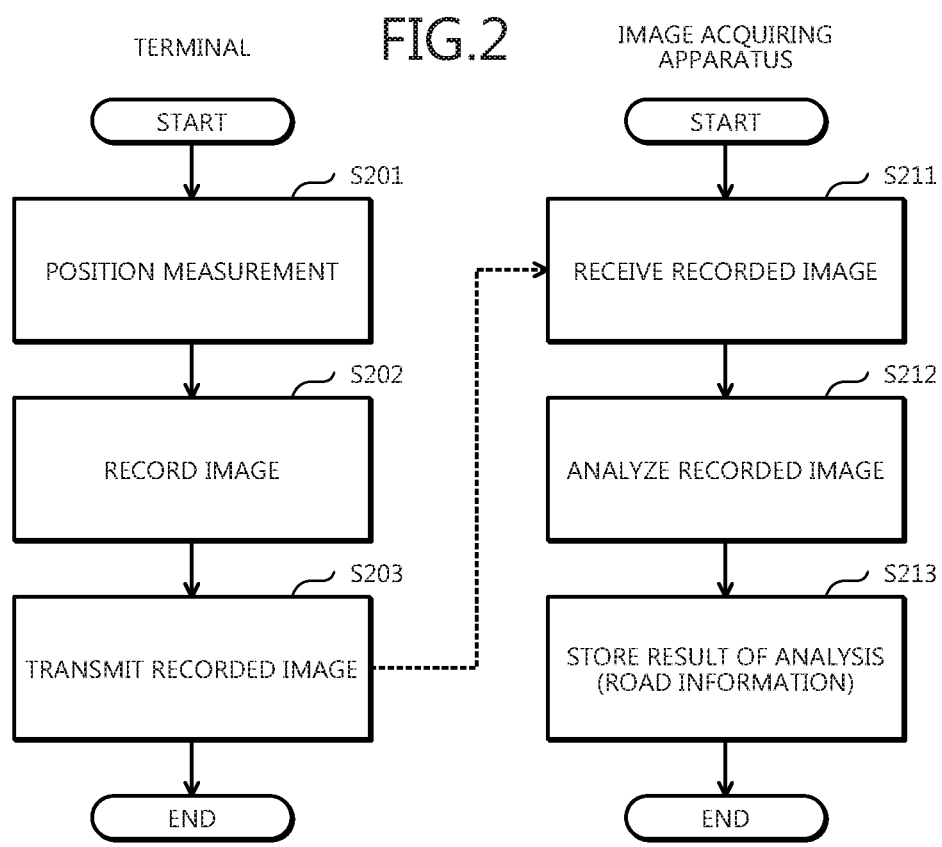
FIG. 2 is a flowchart of an example of processes performed by the image acquiring system according to the embodiment.

FIG. 2 is a flowchart of an example of processes performed by the image acquiring system according to the embodiment. Processes of the image acquiring apparatus 101 and the terminal 111 are depicted.

As the vehicle travels, the terminal 111 performs position measurement by GPS (step S201), and records an image including a road at a given position by the camera 112 (step S202). The recording position may be specified at regular time intervals, or by user operation.

The terminal 111 appends recording information including the position obtained by the position measurement to the recorded image, and transmits the recorded image to the image acquiring apparatus 101 via the communication unit 113 (step S203).

The image acquiring apparatus 101 receives the recorded image by the acquiring unit 103 via the communication unit 102 (step S211). The acquiring unit 103 stores the recorded image and the recording information thereof into the storage unit 104.

The analyzing unit 105 analyzes the recorded image stored in the storage unit 104 (step S212). The analyzing unit 105 analyzes through image processing, road conditions indicated by the recorded image, that is, road information such as the width of the road at each position, the operation state of traffic light, and the presence/absence of crack, snow cover, and ice.

The analyzing unit 105 stores the result of the analysis into the storage unit 104 as a database (step S213). This database associates the recording information and the road information that is the result of the analysis. For example, the width of road at each recording position, the operation state of traffic light, and the presence/absence of crack, snow cover, and ice are determined and stored. The database may store the recorded image for the recording position.

Thus, the road information that is the result of the analysis of each recorded image transmitted from the terminal 111 can be stored in the storage unit 104 as the database. Thereafter, the result of the analysis (road information) for a given position corresponding to a request from the terminal 111 can be delivered to the terminal 111.

According to the embodiment described above, the image acquiring apparatus can determine road conditions at each position by performing image analysis on the recorded image including the road on which the vehicle actually travels. The result of the determination may be delivered to the terminal, thereby enabling the terminal to obtain the road information obtained through the image analysis, such as the width of the road at each position, the operation state of traffic light, and the presence/absence of crack, snow cover, and ice. Thus, it can be easily determined whether a road is passable.

It also becomes possible to determine the vehicle type that can travel on a given road, and/or to take measures to travel on the road (in case of snow cover, the vehicle can be equipped with tires and chains), before the vehicle actually travels on the road. Thus, road conditions can be accurately determined based on the actually-recorded images.

First Embodiment

A first embodiment of the present invention is described next. In the first embodiment, a navigation device 300 is mounted on a vehicle of a user and connected to a server. An example in which the server functions as the image acquiring apparatus 101 is described.

(Hardware Configuration of Navigation Device 300)

Figure 3:
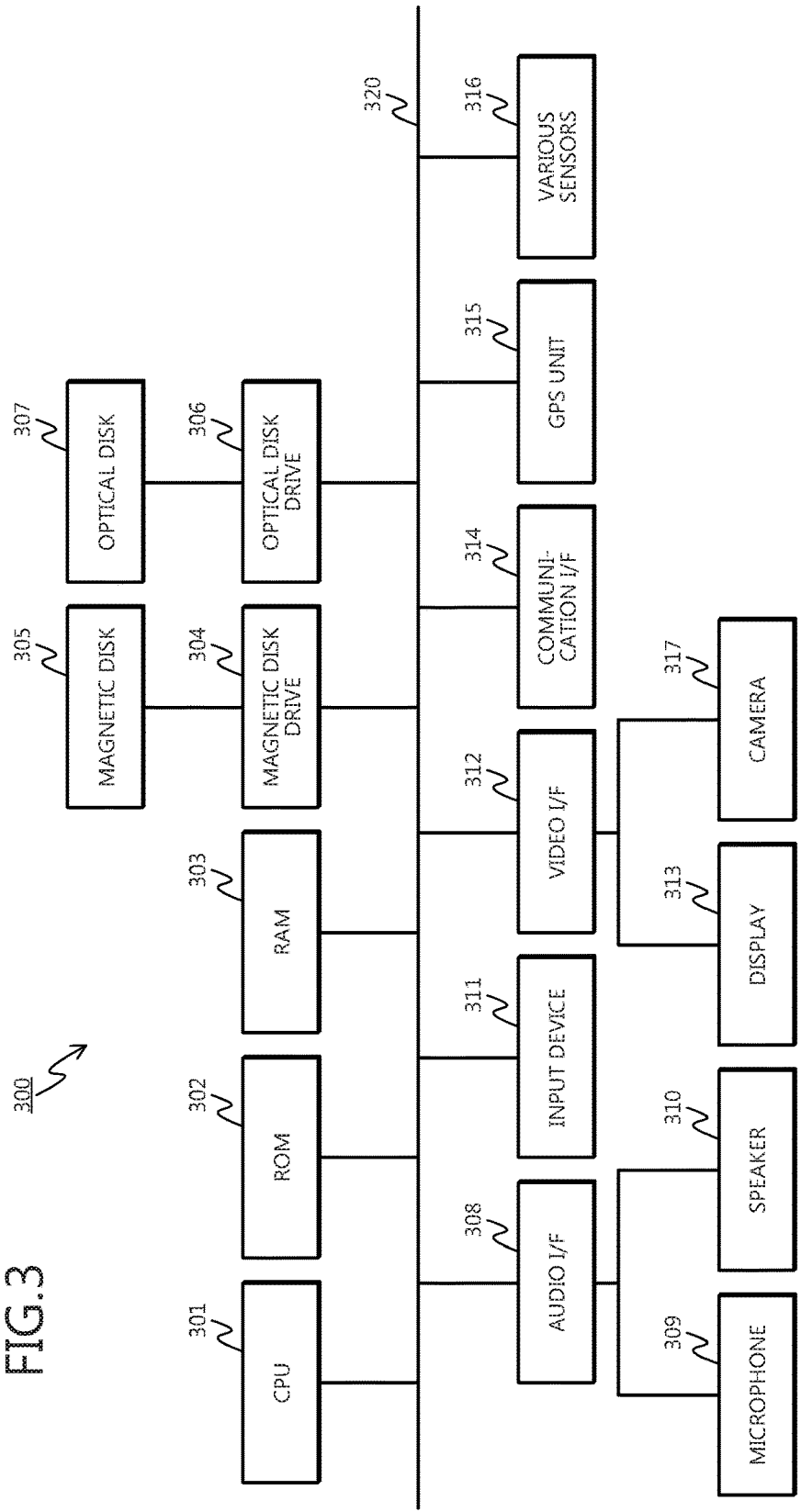
FIG. 3 is a block diagram of an example of hardware configuration of a navigation device.

FIG. 3 is a block diagram of an example of hardware configuration of the navigation device. As depicted in FIG. 3, the navigation device 300 includes a CPU 301, a ROM 302, a RAM 303, a magnetic disk drive 304, a magnetic disk 305, an optical disk drive 306, an optical disk 307, an audio interface (I/F) 308, a microphone 309, a speaker 310, an input device 311, a video I/F 312, a display 313, a communication I/F 314, a GPS unit 315, various sensors 316, and a camera 317 (corresponding to the camera 112 depicted in FIG. 1). These units 301 to 317 are connected by a bus 320.

The CPU 301 controls the entire navigation device 300. The ROM 302 stores therein a boot program and an image acquiring program. The RAM 303 is used as a work area of the CPU 301. That is, the CPU 301 controls the entire navigation device 300 by executing various programs stored in the ROM 302, while using the RAM 303 as a work area.

The magnetic disk drive 304 controls the reading and writing of data with respect to the magnetic disk 305 under the control of the CPU 301. The magnetic disk 305 stores therein the data that is written under the control of the magnetic disk drive 304. For example, a hard disk (HD) and a flexible disk (FD) may be used as the magnetic disk 305.

The optical disk drive 306 controls the reading and writing of data with respect to the optical disk 307 under the control of the CPU 301. The optical disk 307 is an attachable/detachable recording medium from which data is read under the control of the optical disk drive 306. A rewritable recording medium may be used as the optical disk 307. Not only the optical disk 307, but also an MO and a memory card may be used as the attachable/detachable recording medium.

The magnetic disk 305 and the optical disk 307 store therein information such as map data, vehicle information, road information, and traveling history. The map data is used in a route search by the car navigation system, and is vector data that includes background data representing features such as buildings, rivers, land surface, energy supply facilities, etc., and road shape data representing the shape of roads by links and nodes.

The audio I/F 308 is connected to the microphone 309 for audio input and the speaker 310 for audio output. Sound received by the microphone 309 is subjected to A/D conversion in the audio I/F 308. One or more microphones 309 may be placed on a dashboard of the vehicle, for example. The speaker 310 outputs sound that is a given audio signal subjected to D/A conversion in the audio I/F 308.

The input device 311 is a remote controller, a keyboard, or a touch panel that includes keys for inputting characters, numeric values, and various instructions. The input device 311 may be any one of the remote controller, the keyboard, and the touch panel, or any combination thereof.

The video I/F 312 is connected to the display 313. The video I/F 312 includes a graphic controller that controls the entire display 313, a buffer memory such as a video RAM (VRAM) that temporarily stores image data that can be displayed immediately, and a control IC that controls the display 313 based on the image data output from the graphic controller.

Icons, a cursor, menus, windows, and various data such as characters and images are displayed on the display 313. A TFT liquid crystal display or an organic EL display may be used as the display 313.

The camera 317 records an image including a road outside the vehicle. The image may be a still image or video. The image of the outside of the vehicle recorded by the camera 317 is subjected to image analysis by the CPU 301, or output to a recording medium such as the magnetic disk 305 and the optical disk 307 via the video I/F 312.

The communication I/F 314 is connected to a network by radio, and functions as an interface between the navigation device 300 and the CPU 301. The network is a communication network such as an in-vehicle network (controller area network (CAN), local interconnect network (LIN), etc.), public switched telephone network and cellular phone network, dedicated short range communication (DSRC), LAN, and WAN. The communication I/F 314 is a connection module for PSTN, an electronic toll collection system (ETC) unit, an FM tuner, or a Vehicle Information and Communication System (VICS) (registered trademark) beacon receiver.

The GPS unit 315 receives radio waves from GPS satellites, and outputs information indicating the current position of the vehicle. Along with values output from the various sensors 316 described later, the information output from the GPS unit 315 is used to calculate the current position of the vehicle by the CPU 301. The information indicating the current position indicates one point in the map data such as longitude, latitude, and height.

Various sensors 316 include a speed sensor, an acceleration sensor, an angular rate sensor, and a gradient sensor, etc., and output information for determining the position and/or the behavior of the vehicle. Outputs from the various sensors 316 are used to calculate the current position of the vehicle by the CPU 301, and to calculate a change in the speed and/or the direction.

(Configuration Example of Server)

The server used as the image acquiring apparatus has the same configuration depicted in FIG. 3. The server does not need to include the GPS unit 315, the various sensors 316, and the camera 317 depicted in FIG. 3.

The image acquiring apparatus 101 depicted in FIG. 1 achieves functions such as image acquisition, image analysis, and delivery of the result of the analysis by the CPU 301 executing a given program, using programs and data stored in the ROM 302, the RAM 303, the magnetic disk 305, and/or the optical disk 307 depicted in FIG. 3. The communication I/F 314 depicted in FIG. 3 achieves functions of the communication unit 102 depicted in FIG. 1.

The navigation device 300 may have the functions of the image acquiring apparatus 101 depicted in FIG. 1. In this case, the server becomes unnecessary since the navigation device 300 mounted on the vehicle of the user functions as the image acquiring apparatus 101.

(Details of Image Analysis)

Details of image analysis performed by the server functioning as the image acquiring apparatus 101 are described next. Through the image analysis, the image acquiring apparatus 101 generates the following analysis items as road information.

1. Width and Road Area

The analyzing unit 105 of the image acquiring apparatus 101 performs image processing, identifies an area in the recorded image and resembling a road, and calculates the width of the identified road. The road area is identified based on the color of the surface of the road, lanes (lines) on the road, etc.

The analyzing unit 105 calculates the minimum value, the maximum value, and the average value of the width of the road included in the image, based on lanes (center line and side line) on the road, the number of the lanes, the size of other objects included in the recorded image (for example, the size of vehicle for each vehicle type). The width may be calculated more accurately by also using the position of the recorded image to which the camera 112 is oriented, the direction, the field angle, and/or the position of the road in the recorded image.

2. Road Surface Conditions

The analyzing unit 105 determines the presence/absence of a crack, and the length and the width of the crack by performing image processing for extracting edges of the road area identified in the recorded image. The analyzing unit 105 also determines a state of snow and/or rain on the road resulting from weather, by acquiring the color of the road area identified in the recorded image. For example, the analyzing unit 105 determines snow if the color of the road area is white, and rain if there is a lot of reflection.

For the determination of the road surface conditions, images of mud, rut, ice, and snow cover may be acquired and the feature amounts of images of each condition may be learned in advance. In this case, the road surface condition indicated by the recorded image can be determined based on the learning result, thereby enabling more accurate determination of the road surface conditions.

3. Determination of Operation of Traffic Light

Whether there is a traffic light within the camera angle (within the recorded image) is checked based on position information indicating where a traffic light is located, and the position and the traveling direction of the vehicle when the image is recorded. If there is a traffic light within the camera angle, a luminous object having the color of a normally-operating traffic light (red, yellow, or green) is extracted. If a luminous object is extracted, the traffic light is determined to be operating. Alternatively, the traffic light may be determined to be normally operating if the color of the luminous object changes with time (differs in other recorded images).

On the other hand, if there is a traffic light within the camera angle but no luminous object having the color of a normally-operating traffic light (red, yellow, or green) is extracted, the traffic light is determined to not being operating (suspended).

FIG. 4 is a diagram of an example of a database stored through the image analysis according to the first embodiment. A database 400 stored in the storage unit 104 is depicted. The database 400 includes recording information 401 and road information 402. In FIG. 4, data based on three recorded images are arranged in the vertical direction. Although not depicted in FIG. 4, the recorded images or link information indicating the location of the recorded images may be also stored.

The recording information 401 is based on information transmitted from the terminal 111, and includes: recording coordinates 411 indicating the longitude and the latitude of the recording position; a traveling direction 412 of the vehicle (the direction in which the recorded image is oriented); a road number 413 indicating the identification number (ID) of a road (a link, a road between a pair of intersections, etc.) that is at the recording position and obtained from the map data; a granular road position 414 on the road indicated by the road number (for example, the recording position when the interval between a pair of intersections is taken as 0 to 1); and a road direction 415 (inbound/outbound) in which the vehicle is traveling (the direction recorded in the recorded image).

Among the recording information 401, it is sufficient for the terminal 111 to transmit at least the recording coordinates 411 to the image acquiring apparatus 101; the traveling direction 412 to the road direction 415 may be generated by the image acquiring apparatus 101 by using the map data.

The road information 402 includes analysis items obtained through the image analysis of the recorded image indicated by the recording information 401. The analysis items depicted in FIG. 4 include: a width 421 of a road, the operation state 422 of traffic light, the presence/absence of crack 423, the presence/absence of snow cover 424, the presence/absence of ice 425, the presence/absence of mud 426, the presence/absence of flood 427, and the presence/absence of rut 428.

Among the analysis items of the road information 402, the width 421 is set to 0 or a predetermined value for a corresponding position based on the map data, and overwritten by the result of the image analysis of the recorded image. The operation state 422 of traffic light is initially set to "–" (yet checked), and based on the result of the analysis of the recorded image, set to "TRUE" if the traffic light is operating, while "FALSE" if the traffic light is suspended. Other analysis items are initially set to "FALSE", and "TRUE" is set to the corresponding analysis item if traffic disturbance (such as crack, snow cover, etc.) is detected through the analysis of the recorded image.

In FIG. 4, the image analysis is performed for each recorded image and analysis items 421 to 428 are determined, thereby generating the road information 402. However, if images recorded at close positions are acquired (for example, recorded images of the same traffic light), the road information 402 (the analysis items 421 to 428) may be collectively generated using the result of the analysis on each of the recorded images. Thus, more accurate image analysis can be performed without being affected by the quality (resolution, brightness, etc.) of the recorded image.

Figure 5:
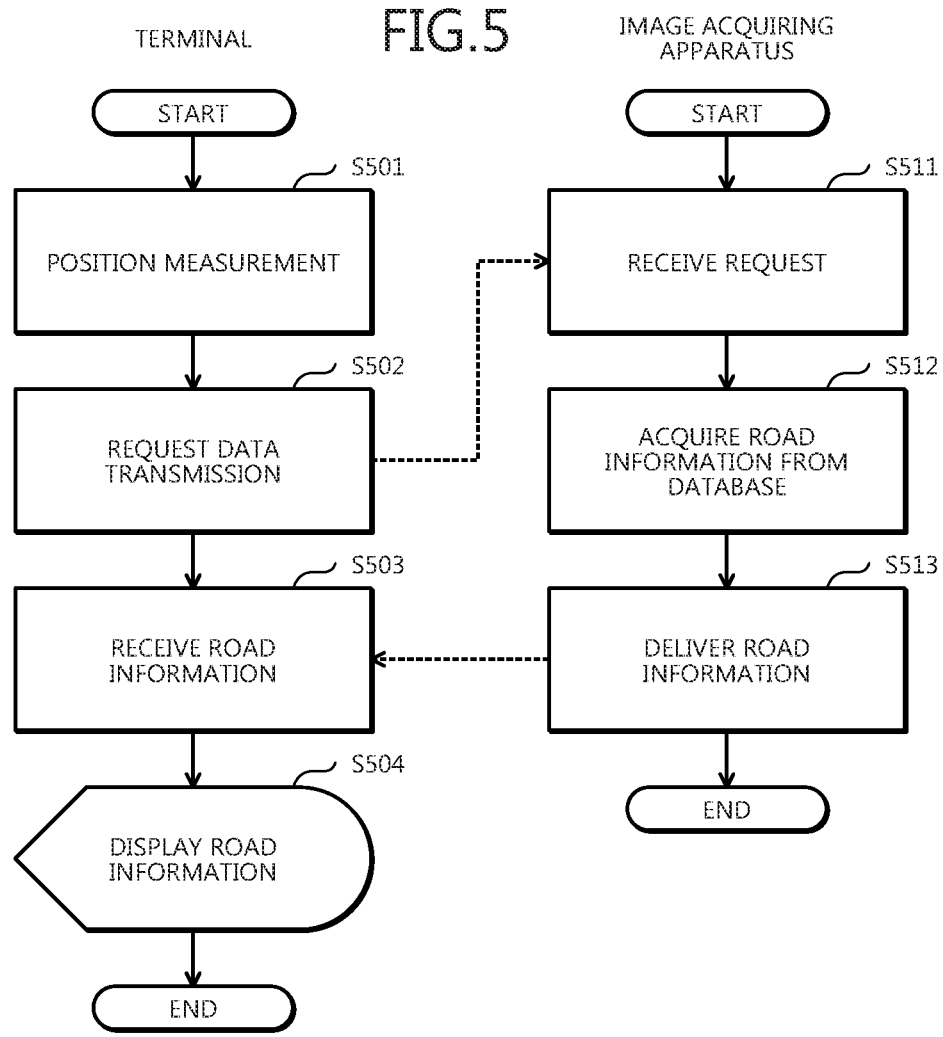
FIG. 5 is a flowchart of an example of information delivery after the image analysis.

FIG. 5 is a flowchart of an example of information delivery after the image analysis. An example in which the image acquiring apparatus 101 delivers road information 402 near the current position of the car navigation device functioning as the terminal 111 is depicted.

The terminal 111 such as the car navigation device continually measures the current position by GPS (step S501), and requests the image acquiring apparatus 101 to transmit the road information 402 of a given position (for example, the current position of the terminal 111) (step S502).

The terminal 111 receives the road information 402 from the image acquiring apparatus 101 (step S503), and displays the road information 402 (step S504).

The image acquiring apparatus 101 receives a transmission request for the road information 402 from the terminal 111 (step S511), searches the database 400 for the position included in the transmission request, acquires the road information 402 for the position (step S512), and delivers the acquired road information 402 to the terminal 111 (step S513).

The image acquiring apparatus 101 may deliver all of the analysis items 421 to 428 of the road information 402 for the position (recording position) in the database 400 depicted in FIG. 4, or may extract and deliver only an analysis item(s) indicating traffic disturbance.

The terminal 111 may transmit not only the current position, but also another position(s) different from the current position (for example, a given position(s) on a scheduled route), thereby acquiring road information 402 of the specified position(s).

Alternatively, the terminal 111 may transmit the scheduled route, thereby enabling the image acquiring apparatus 101 to deliver road information 402 for the scheduled route.

In this case, the image acquiring apparatus 101 extracts from the road information 402 for corresponding positions, the analysis item(s) indicating traffic disturbance on the scheduled route, and delivers the analysis item(s) to the terminal 111.

The terminal 111 may specify the position not only by the longitude and the latitude, but also by a landmark, a facility, etc. In this case, the image acquiring apparatus 101 delivers road information 402 around the landmark or the facility to the terminal 111.

The terminal 111 that receives the delivery of road information 402 may be a home personal computer, and may request and acquire road information 402 for any arbitral position.

As described above, the image acquiring apparatus 101 analyzes the recorded image transmitted from the terminal 111 and including a road on which the vehicle actually travels, determines the analysis items concerning traffic through the image analysis, and may deliver the analysis items. Thus, the terminal 111 can acquire road information 402 even for a road on which the vehicle does not yet travel (a road on which the vehicle is planning to travel), based on the recorded image of another terminal 111 mounted on another vehicle.

The database 400 including the road information 402 is updated for each input of a new recorded image, and thus can always provide the latest road information 402.

Figure 6:
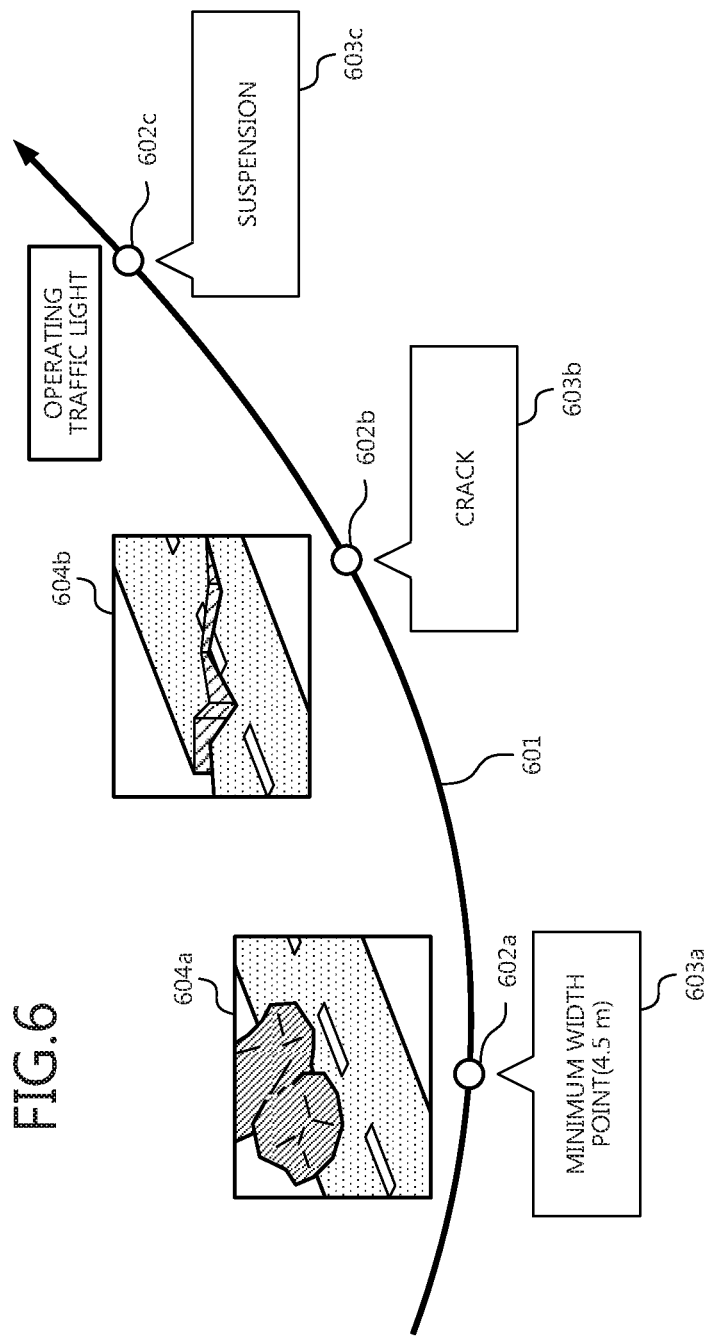
FIG. 6 is a diagram for explaining delivery of road information.

FIG. 6 is a diagram for explaining delivery of road information. An example is depicted in which the terminal 111 transmits a scheduled route to the image acquiring apparatus 101, and displays road information 402 transmitted from the image acquiring apparatus 101.

Traffic disturbance is assumed to be detected at each of positions 602a, 602b, and 602c on a scheduled route 601, through the image analysis on the recorded image performed by the image acquiring apparatus 101. In this case, the image acquiring apparatus 101 transmits to the terminal 111, the positions 602a, 602b, and 602c and traffic disturbance events (analysis items) occurring at the positions 602a, 602b, and 602c as the road information 402.

On the display of the terminal 111, the minimum width point (4.5 m) on the scheduled route 601 is indicated by a character string 603a at the position 602a indicated by the road information 402. A character string 603b indicates a crack occurs at the position 602b. A character string 603c indicates suspension of the operation of the traffic light located at the position 602c.

The image acquiring apparatus 101 may transmit to the terminal 111, the recorded image for each position at which a traffic disturbance event occurs; in FIG. 6, a recorded image 604a for the position 602a and a recorded image 604b for the position 602b may be displayed. The width reduced due to debris on the roadside is depicted in the recorded image 604a. The state of a crack occurring on the road is depicted in the recorded image 604b. These recorded images enable a user of the terminal 111 to know more specifically how the traffic disturbance event is occurring.

Second Embodiment

A second embodiment according to the present invention is described next. In the second embodiment, upon detection of a road that the vehicle actually travels but is not included in the map data, the road is registered into the database as a new road. A configuration similar to the first embodiment (FIG. 1) may be used in the second embodiment.

The car navigation device functioning as the terminal 111 determines a traveling state at regular time intervals by using sensor information. In the second embodiment, the terminal 111 determines that the traveling state indicates that the vehicle is traveling on an existing road, if a change in the traveling direction is small and the speed is sufficiently high.

Each time an image is recorded according to the first embodiment as the vehicle travels, the terminal 111 determines whether the vehicle is in a road traveling state. The terminal 111 consults the map data (road map information) and determines whether there is a road of a similar shape near the current position.

If the result of the determination indicates that the recording position is not registered in the map data (the position is different from those of existing roads), the measured recording position and the recording date (corresponding to the recording information 401) of the recorded image are stored in the terminal 111 as a new road. In this case, the terminal 111 may determine a road to be a new road if a sequence of recorded images for different recording positions is not registered in the map data. The terminal 111 appends an identifier indicating a new road to the recorded images, and transmits the recorded images to the image acquiring apparatus 101.

Based on the recording position and the recording date of the recorded image received from the terminal 111, the image acquiring apparatus 101 such as the server sorts the recorded images according to the recording date, connects the recording positions for the recorded images by lines, and stores the lines into the storage unit 104 as a new road. This new road may be delivered to the terminal 111.

Figure 7:
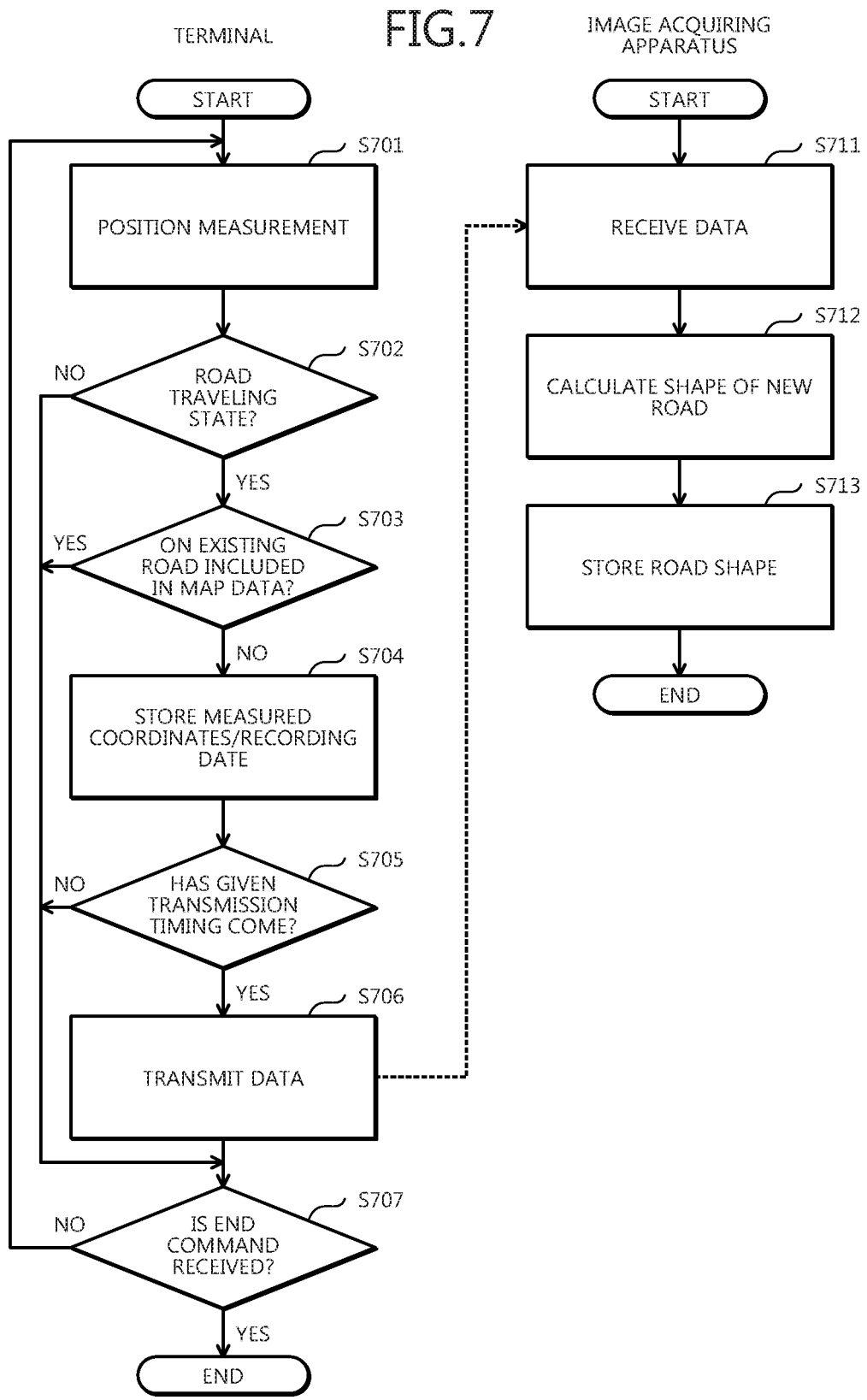
FIG. 7 is a flowchart of a process concerning a new road according to a second embodiment.

FIG. 7 is a flowchart of a process concerning a new road according to the second embodiment. An example is depicted in which images are recorded as the vehicle travels until an end command is issued by user operation. The terminal 111 measures the current position as the vehicle travels (step S701), and determines for each recording position at which a road image is recorded as the vehicle travels, whether the vehicle is in the road traveling state (step S702).

If the vehicle is in the road traveling state (step S702: YES), the terminal 111 determines whether the recording position is on an existing road included in the map data (step S703). If not (step S703: NO), the process transits to step S704, and the recording position (measured coordinates) and the recording date of the recorded image are stored in the terminal 111.

On the other hand, if the vehicle is not in the road traveling state (step S702: NO), or the recording position is on an existing road (step S703: YES), the process transits to step S707.

At step S704, the recording position (measured coordinates) and the recording date of the recorded image, which is recorded in the road traveling state (step S702) and not on the existing road (step S703), are stored in the terminal 111 (step S704). The terminal 111 determines whether a given transmission timing has come (step S705). The transmission timing comes at regular time intervals, or each time the recording position and the recording date are stored for a given number of recorded images at step S704. Until the transmission timing comes (step S705: NO), the process transits to step S707, and when the transmission timing comes (step S705: YES), the recorded images (recording information) are transmitted to the image acquiring apparatus 101 (step S706).

Until the end command for recoding images is received (step S707: NO), the process transits to step S701, and the processes described above are continually executed. If the end command is received (step S707: YES), the terminal 111 ends the sequence of processes described above.

The image acquiring apparatus 101 receives the recorded images transmitted from the terminal 111 (step S711), and if an identifier indicating a new road is appended to the recorded images, the analyzing unit 105 calculates the shape of the new road based on the recorded images (step S712).

In the calculation of the shape of the new road, based on the recording position and the recording date of the received recorded images, the recorded images are sorted according to the recording date. Among these recorded images, recording positions that are adjacent in the map data and at which images having close recording times are recorded are connected by a line. A curve that smoothly connects the recording positions may be used.

The analyzing unit 105 of the image acquiring apparatus 101 stores as a new road, the lines (road shape) connecting the recording positions for the recorded images into the storage unit 104 (step S713). The new road may be added to the existing map data, thereby updating the map data.

In the processes described above, the terminal 111 consults the map data and determines whether the recording position for the recorded image is on an existing road; however, this determination may be made by the image acquiring apparatus 101 such as the server. In this case, the terminal 111 does not need to consult the map data and to determine whether the recording position for the recorded image is on the existing road.

According to the processes described above, a new road that is not included in the map data can be generated based on the recording positions for the recorded images. Since the recorded images include a road on which the vehicle actually travels, a newly-opened (passable) road can be more quickly delivered to the terminal 111. Further, the map data can be easily and quickly updated.

For example, if recorded images are acquired for a road having the position and the shape different from any road existed before a disaster occurs, a newly-opened road that has recovered from the disaster can be delivered as a new road, and the map data can be updated. Thus, the number of candidate routes when a disaster occurs can be increased, and traffic after the recovery can be supported.

Third Embodiment

A third embodiment according to the present invention is described next. The third embodiment is a variation of the second embodiment, and focuses on collecting recording information for positions on a road with no traveling history, a road with a problem in the road surface conditions, etc.

The image acquiring apparatus 101 such as the server requests the terminal 111 such as the car navigation device to transmit recording information for a road necessary to create and update the map data, such as a road with no traveling history, a road with a problem in the road surface conditions, etc. Thus, a request for the recording information includes a given area, position, direction, road type, etc.

The terminal 111 to which the recording information is requested receives the area, position, direction, and road type included in the request for the recording information, and if the current position matches the request, records an image at the current position and transmits the recorded image (and the recording position, etc.) to the image acquiring apparatus 101.

Alternatively, the terminal 111 to which the recording information is requested may receive the area, position, direction, and road type included in the request for the recording information, move to a position that matches the request (for example, circulate within the requested area), and transmit the recorded image (and the recording position, etc.) to the image acquiring apparatus 101, thereby actively responding to the request.

Thus, the image acquiring apparatus 101 can collect from the terminals 111, recording information that matches the request, generate road information 402 in which the latest state of a road with no traveling history and/or a road with a problem in the road surface conditions is reflected, and update the database 400. Further, map data for the road with no traveling history can be easily created and updated by using the database 400.

Fourth Embodiment

A fourth embodiment of the present invention is described next. In the fourth embodiment, a recorded position and a road are identified from the recorded image.

Figure 8:
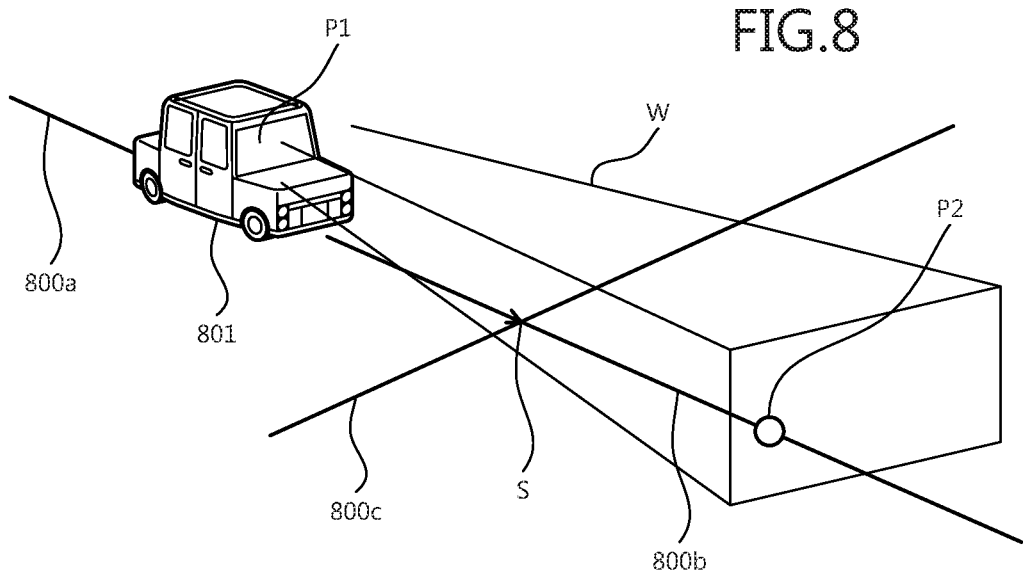
FIG. 8 is a diagram for explaining a recording position and a recorded position.

FIG. 8 is a diagram for explaining a recording position and a recorded position. As depicted in FIG. 8, a vehicle 801 is located at a recording position P1 on a road 800*a*, and the recording area W of the camera 112 is oriented to the traveling direction along the road 800*a*. In this case, a position (event coordinates P2) at which traffic disturbance is determined to occur through the analysis of the recorded image may be located on a road 800*b* different from the road 800*a* on which the recording position is located. The road 800*a* crosses with other roads 800*b* and 800*c* at the intersection S.

In this case, the analyzing unit 105 changes information such as the recording position for the recorded image, based on information included in the recorded image such as the position, the direction, the field angle, and/or the position of the road in the recorded image.

FIG. 9 is a diagram of an example of a database changed through image processing according to the fourth embodiment. Among the recording information 401 (see FIG. 4) in the database 400 set by the processes described above, the recording coordinates 411 and the road number 413 are changed corresponding to the event coordinates.

Since the recording coordinates 411 depicted in FIG. 4 is the recording position P1, through the image processing, this item (the recording coordinates 411) is changed to the event coordinates P2 (411*a*) indicating a position ahead of the vehicle in the traveling direction by a given distance. The road number 413 is changed to an event-occurring road number 413*a*, and set to the new road 800*b* corresponding to the event coordinates P2 (411*a*).

In the above explanation, the recording coordinates are changed to the event coordinates; however, the recording information 401 including the recording coordinates 411 and the road number 413 before the change may be left, and may be managed along with the recording information 401 after the change depicted in FIG. 9. Thus, both the recording coordinates and the event coordinates can be left and used for a later image analysis and a verification of conditions used for the analysis.

Figure 10A:
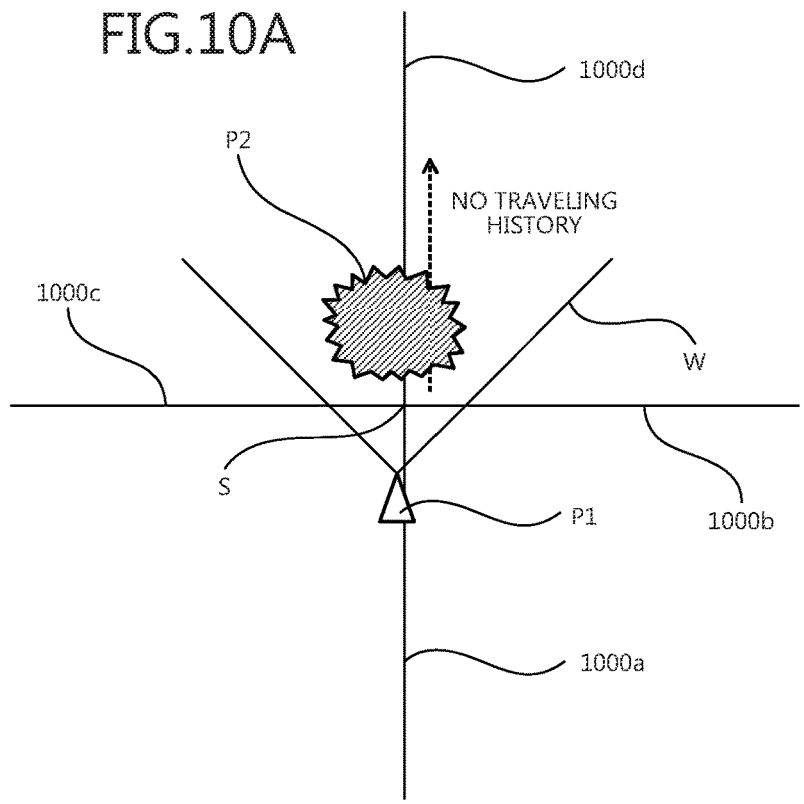
FIG. 10A is a diagram for explaining how to analyze whether a road with no traveling history is passable.

FIG. 10A is a diagram for explaining how to analyze whether a road with no traveling history is passable. As described above, the image acquiring apparatus 101 such as the server sequentially acquires recorded images from the terminal 111 such as the vehicle traveling on the road, updates the database 400, and updates roads in the map data.

Among roads 1000*a* to 1000*d* crossing at the intersection S depicted in FIG. 10A, traveling history for the road 1000*d* that is assumed to be passable is assumed to become undetectable. For example, it is determined that the traveling history of the road 1000*d* has become undetectable when the current position of a vehicle traveling on the road 1000*d* cannot be acquired.

In this case, if a recorded image of which recording position (event coordinates) is located on the road 1000*d* is acquired, the image acquiring apparatus 101 analyzes the recorded image and obtains each analysis item (the width, the operation state of traffic light, etc.) of the road information 402. Thus, if the width has become less than or equal to a threshold preventing traffic due to obstacles covering the entire surface of the road, the road 1000*d* can be determined to be not passable, and the map data can be updated. In this case, as described above, each analysis item of the road 1000*d* can be obtained without actually traveling on the road 1000*d* by obtaining the event coordinates P2 from the recorded image, and the road 1000*d* can be determined to be not passable.

Figure 10B:
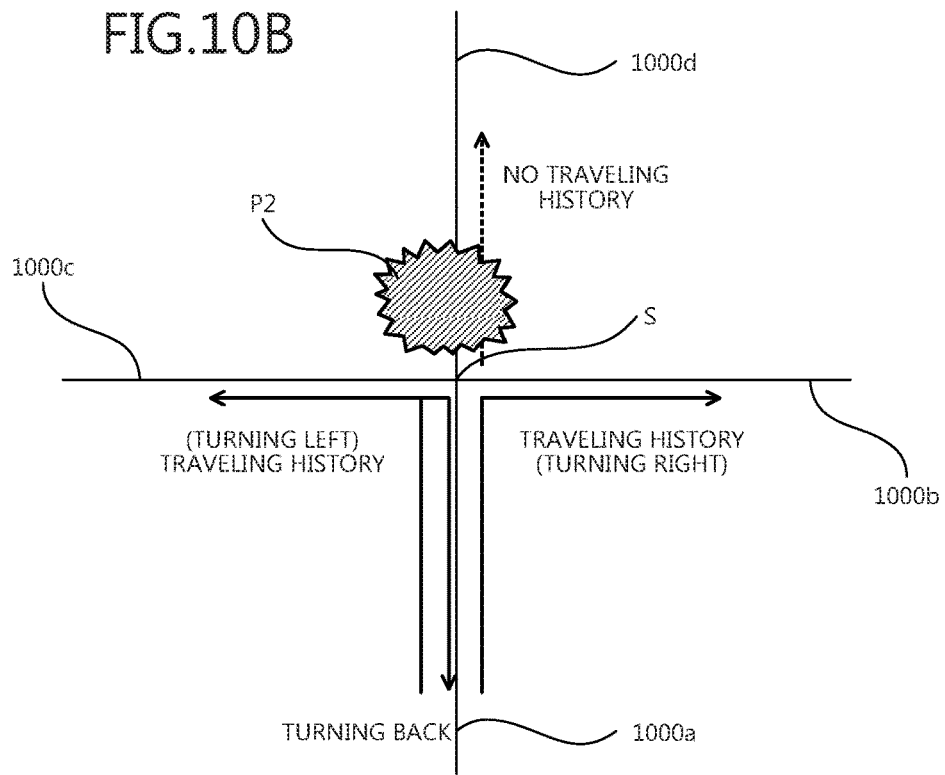
FIG. 10B is a diagram for explaining how to identify a road with no traveling history.

FIG. 10B is a diagram for explaining how to identify a road with no traveling history. The identification of the road 1000*d* depicted in FIG. 10A for which traveling history has become undetectable is not limited to traveling on the road 1000*d*. As depicted in FIG. 10B, assume that the image acquiring apparatus 101 can acquire traveling history of vehicles turning back, turning right, or turning left at the intersection, but no vehicle passes through (enters into) the road 1000*d*. In this case, the image acquiring apparatus 101 determines that traffic disturbance may have occurred on the road 1000*d*.

The image acquiring apparatus 101 requests the terminal 111 to collect information on the road 1000*d*. Specifically, the image acquiring apparatus 101 requests the terminal 111 to acquire a recorded image for the road 1000*d*. Thus, based on the recorded image (and the recording position, etc.) transmitted from the terminal 111, each analysis item of the road information 402 for the road 1000*d* can be obtained through the image processing described above. It also becomes possible to determine whether the road is passable, and if not, the map data can be updated.

As described above, according to the invention, the state of a road can be accurately determined by performing the image analysis on the recorded image including the road and by generating the road information concerning traffic. The road information can be updated for each input of a new recorded image, and the latest road information and the latest map data can be always provided.

In the embodiments, a navigation device is used as the terminal; however, other terminals such as a smart phone may be used.

The image acquiring method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

EXPLANATIONS OF LETTERS OR NUMERALS 100 image acquiring system
101 image acquiring apparatus
102 communication unit
103 acquiring unit
104 storage unit
105 analyzing unit
111 terminal
112 camera
113 communication unit
114 display unit
121 network
300 navigation device
400 database
401 recording information
402 road information

The invention claimed is:

1. An image acquiring apparatus configured to communicate with a terminal connected to a camera, the image acquiring apparatus comprising:
    a communications device; and
    one or more processors in operational communication with at least the communications device, the one or more processors configured to:
        acquire a first image;
        determine a state of a road included in the first image based on the first image; and
        transmit to the terminal an acquisition request for a second image of the road, where the state of the road has been determined to have a problem in a road surface condition, and where the second image is newly obtained by the camera in response to the acquisition request.

2. The image acquiring apparatus according to claim 1, wherein the one or more processors are further configured to acquire the first image and the second image from one or more moving terminals.

3. The image acquiring apparatus according to claim 2, wherein the one or more processors are further configured to acquire, from the one or more moving objects, position information with the first image indicating a position at which the first image is recorded.

4. The image acquiring apparatus according to claim 3, wherein the one or more processors are further configured to:
    associate the state of the road and the position information,
    store, in a storage, the state of the road and the position information, and
    transmit the state of the road and the position information.

5. A terminal configured to communicate with an image acquiring apparatus, the terminal being connected to a camera configured to record a first image, the terminal comprising:
    a display;
    a communications device; and
    one or more processors in communication with the display and the communications device, said one or more processors configured to
        transmit the first image and a position information,
        receive information concerning a state of a road,
        receive from the image acquiring apparatus an acquisition request for a second image of the road where the state of the road has been determined to have a problem in a road surface condition, and where the second image being is obtained by the camera in response to the acquisition request, and
        display, on the display, the received information concerning the state of the given road.

6. The terminal according to claim 5, wherein the one or more processors are further configured to transmit the position information, where the position information indicates a position at which the first image is recorded.

7. The terminal according to claim 5, wherein the one or more processors are further configured to transmit a request for information concerning the state of the road.

8. An image acquiring system, comprising:
an image acquiring apparatus; and
a terminal,
wherein the image acquiring apparatus comprises one or more first processors, the one or more first processors configured to
acquire a first image,
determine a state of a road included in the first image based on the first image, and
transmit to the terminal an acquisition request for a second image of the road where the state of the road has been determined to have a problem in a road surface condition, and where the second image is newly obtained by a camera in response to the acquisition request,
wherein the terminal is connected to the camera configured to record the first image, and
wherein the terminal comprises one or more second processors, the one or more second processors configured to
transmit the first image and a position information, and
receive from the image acquiring apparatus the acquisition request.

9. The image acquiring system according to claim 8,
wherein the one or more processors of the terminal are further configured to receive information concerning the state of the road, and
wherein the terminal further comprises
a display that displays the received information concerning the state of the road.

* * * * *